UNITED STATES PATENT OFFICE.

JOHN FETZER, OF ROLLA, MISSOURI.

IMPROVEMENT IN PAINTS.

Specification forming part of Letters Patent No. 175,683, dated April 4, 1876; application filed February 5, 1876.

*To all whom it may concern:*

Be it known that I, JOHN FETZER, of Rolla, Phelps county, Missouri, have invented a new and Improved Paint, of which the following is a specification:

The object of this invention is to furnish an improved fire-proof paint.

The invention consists of a paint prepared of the ingredients, in the proportions and manner, hereinafter fully described.

In the following description, "apothecaries' weight" is used.

The paint is prepared of the ingredients and in the proportions as follows: Pure fire proof clay, two and a half drams; sulphate of lime, one and a half dram; sulphate of barium, fifty grains; calcined magnesia, thirty grains; bleached glue, forty-eight grains; tragacanth gum, forty-eight grains; alum, four drams; linseed-oil, eighty drops; shellac, dissolved in alcohol, two or three grains; and water, five ounces.

The alum is dissolved in three parts of the water. The glue and tragacanth are dissolved in the remainder of the water, and then add about twelve drops of sulphuric acid. Mix the shellac with the oil, and mix it with the clay in a mortar, by constant agitation. To this mixture add the gum solution and the other ingredients; and, finally, add the alum solution.

The paint thus prepared mixes well, and adheres as well as any oil-paint, gives a fine polish, and admits of being marbled. It congeals at 60° Fahrenheit, and should be put in a warm-water bath to be applied.

Any desired color or shade may be given to the paint by means of aniline colors or vegetable dyes.

Having thus described my invention, I claim as new and desire to secure by Letters Patent—

A paint consisting of fire-proof clay, sulphate of lime, sulphate of barium, calcined magnesia, bleached glue, tragacanth gum, alum, linseed-oil, shellac, and water, in the proportions substantially as herein set forth and described.

JOHN FETZER.

Witnesses:
W. J. RUEFF,
L. J. WILLIAMS.